March 9, 1965 W. B. PRICE 3,172,138
SURFACE TREATING APPARATUS
Filed Sept. 16, 1963 2 Sheets-Sheet 1
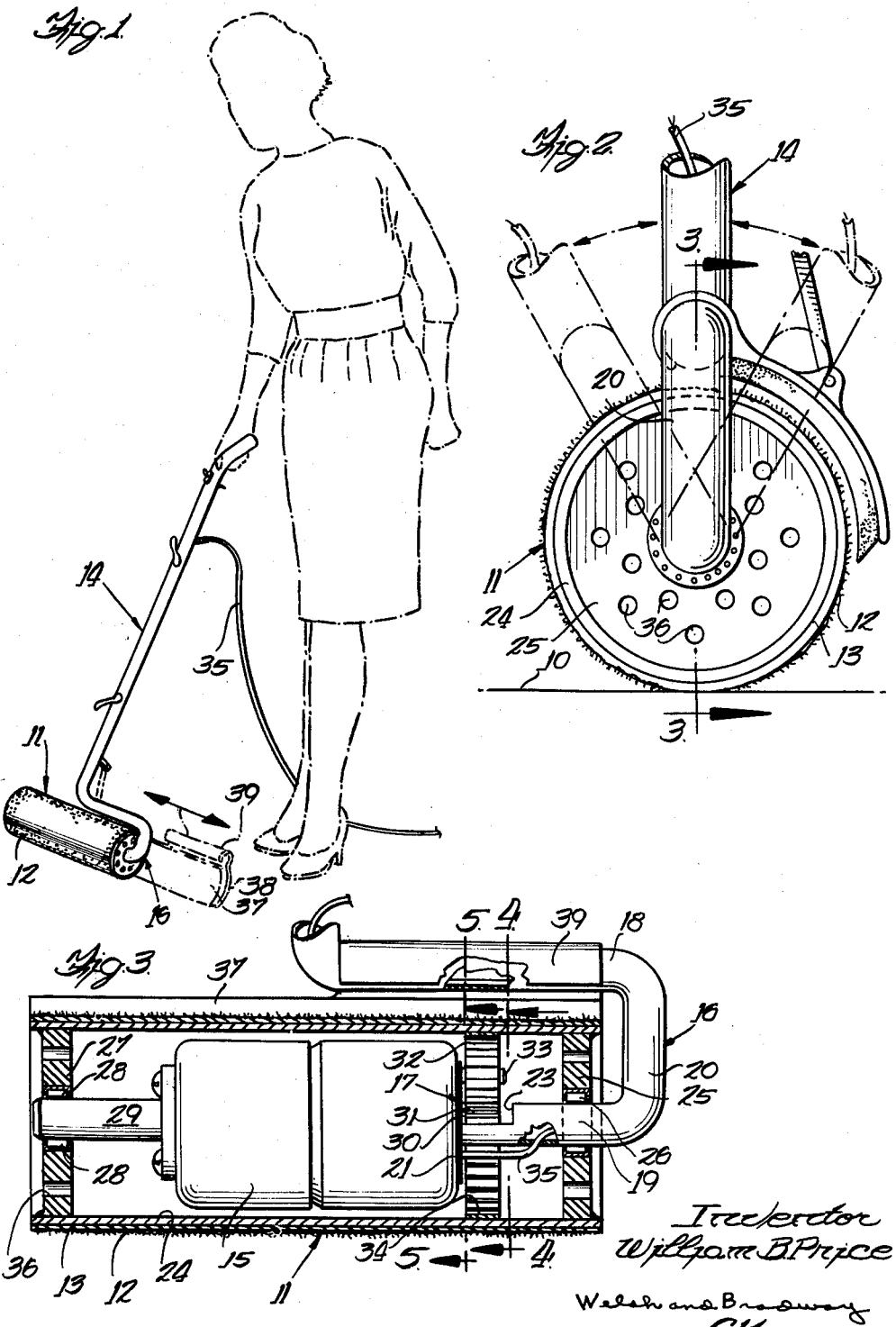
Inventor
William B. Price
Welsh and Bradway
Attorneys March 9, 1965   W. B. PRICE   3,172,138
SURFACE TREATING APPARATUS
Filed Sept. 16, 1963   2 Sheets-Sheet 2
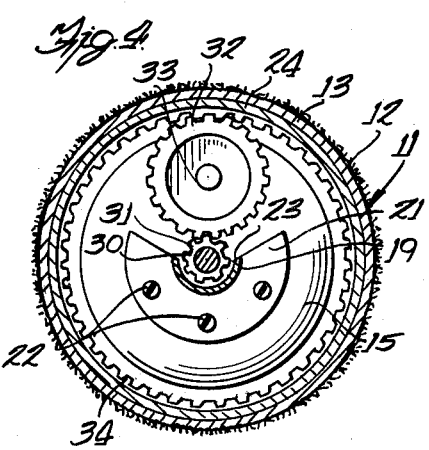
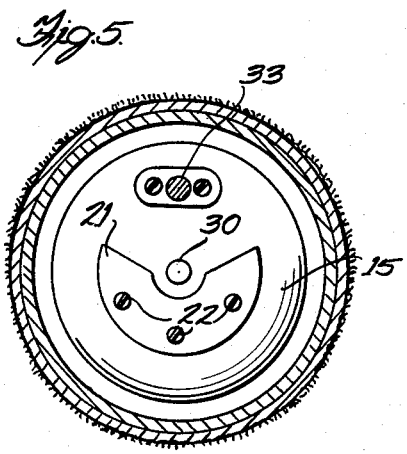
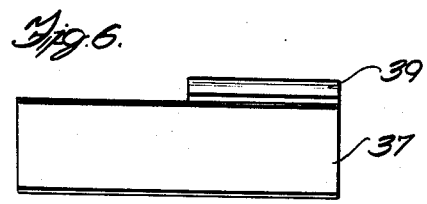
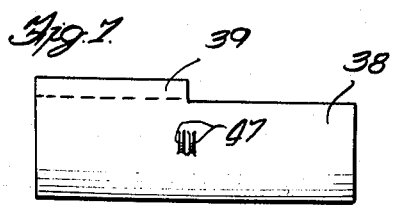
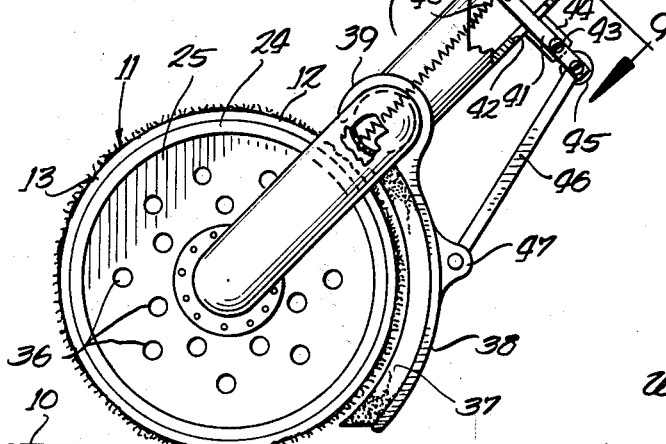
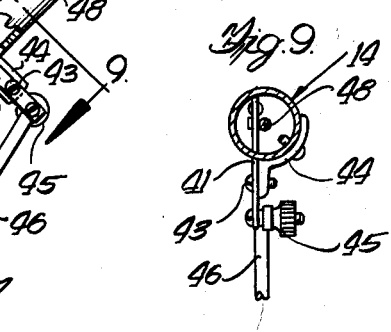
Inventor
William B. Price
Welsh and Bradway
Attorneys

United States Patent Office 3,172,138
Patented Mar. 9, 1965

3,172,138
SURFACE TREATING APPARATUS
William B. Price, 1111 E. Jefferson St., Bloomington, Ill.
Filed Sept. 16, 1963, Ser. No. 309,272
3 Claims. (Cl. 15—98)

This invention relates generally to surface treating machines and, more particularly, to machines of the type having a power driven cylindrical rubbing element or roller rotatable about an axis paralleling the surface such as a floor or rug to be treated by engagement with the roller periphery.

The primary object of the present invention is to provide a novel machine of the above character which is of simple and inexpensive construction, which is very light in weight and easy to maneuver, and which occupies little space so as to facilitate storage and movement in cramped spaces such as beneath furniture.

Another object is to achieve the foregoing object by locating the power driving parts within the roller itself.

A more detailed object is to mount a motor within the roller and on a part which is rigid with the handle and which supports the roller for rotation relative to the motor.

The invention also resides in the novel manner of utilizing the heat of the motor to facilitate the use of the roller to apply wax to the surface being treated.

Other objects and advantages of the invention will become apparent from the following detailed description taken in connection with the accompanying drawings, in which:

FIGURE 1 is a perspective view of a rubbing machine embodying the novel features of the present invention and supported in a working position.

FIG. 2 is a fragmentary end elevational view of the machine showing different positions of the handle.

FIG. 3 is a fragmentary reduced sectional view of the machine taken along the line 3—3 of FIG. 2.

FIGS. 4 and 5 are sectional views taken along the lines 4—4 and 5—5 respectively of FIG. 3.

FIG. 6 is a front elevational view of a wax bar and holder.

FIG. 7 is a rear elevational view of the holder.

FIG. 8 is a view similar to FIG. 2 and showing the actuating mechanism for the wax bar holder.

FIG. 9 is a fragmentary sectional view taken on the line 9—9 of FIG. 8.

The surface treating machine shown in the drawings to illustrate the present invention is especially adapted for the treatment of a floor or floor covering by engagement with an exposed surface 10 thereof. The machine is of the type having a cylindrical rubbing element or roller 11 which is power driven and which rotates about an axis paralleling the surface to be treated when a rubbing surface 12 on the roller periphery is engaging the treated surface. The roller in this instance comprises an inner hollow tube 13 of metal, plastic impregnated fiber board, or other rigid material and the rubbing surface 12 which is an absorbent outer layer such as a monofilament pile fabric, foamed plastic, sheepskin or other natural or synthetic fibers secured to the outer side of the tube and suitable for use in scrubbing, buffing or polishing. The roller is rotatably mounted on the lower end portion of an elongated handle 14 adapted to be gripped by the user for maneuvering the roller over surfaces to be treated.

In accordance with the present invention, the roller 11 and a motor 15 for rotating it are mounted on the handle in a novel manner enabling the machine to be manufactured at low cost and with few parts, and to be of light weight and small size so that it may be maneuvered easily over the surface 10 to be treated and may be stored conveniently. For these purposes, the motor is mounted within the roller on a stationary handle part 16 and is connected to the roller for driving the same through a connection 17 also located within the roller, the part 16 rotatably supporting the roller.

In addition to supporting the roller 11 and the motor 15 within the roller, the handle part 16 is constructed in a novel manner to facilitate removal and replacement of the roller. The part thus is of U-shape with one leg 18 secured rigidly to the lower end of the upright handle section 14 and with a second leg 19 parallel to and spaced from the first leg and receiving the roller and motor. The legs are joined at one end by a cross member 20, but the outer leg 19 is free at its other end for axial telescoping movement into and out of the roller.

To mount the motor 15 on the second or outer leg 19 of the U-shaped termination 16 of the handle 14, the motor housing is secured rigidly to the free end of the leg. In this instance, the handle and the U-shaped portion are formed as a single integral piece of hollow tubing, the outer leg being shorter than the first leg 18 and welded to a plate 21 which is fastened as by screws 22 to a closed end of the cylindrical motor housing (FIGS. 3, 4 and 5). For a purpose to appear later, a radially opening recess 23 is formed in the free end portion of the second leg and the plate 21 extends circumferentially the same number of degrees as the solid portion of the free end portion adjacent the recess.

The roller 11 is mounted on the free end portion 19 of the U-shaped handle part 16 so as to provide relative rotation between the two while facilitating easy removal and replacement of the roller. This is accomplished by the provision of a roller support 24 which telescopes within the roller and itself is mounted on the second leg of the U. For stability, the roller support is mounted at points spaced along the axis of rotation preferably on opposite sides of the motor 15.

In the present instance, the roller support 24 is a cylinder of suitable material such as plastic sized to telescope closely within the roller tube 13 to obtain a frictional driving fit with the roller 11 so that rotation of the support results in rotation of the roller. One end portion of the support cylinder is mounted on the second leg of the U adjacent the cross member through the medium of a disc 25 secured in telescoping relation within the cylinder and journaled at its inner periphery in bearings 26 carried by the leg 19 (FIG. 3). The mounting for the other end portion of the support comprises a similar disc 27 secured in telescoping relation within the cylinder and journaled at its inner periphery in bearings 28 on a stub shaft 29 projecting rigidly from the end of the motor housing remote from the second leg 19. This shaft is aligned axially with the leg and with the shaft 30 of the motor which projects from the other end of the housing into the recess 23 in the free end portion of that leg.

The drive connection 17 between the motor shaft 30 and the roller support 24 is located within the support and includes a spur gear 31 fastened on the motor shaft and meshing with a planetary gear 32 within the radially opening recess 23 of the free end portion of the second leg 19. The planetary gear is journaled on a stub shaft 33 rigid with and projecting from the adjacent end of the motor housing and meshes with a ring gear 34 secured to the inner side of the roller support between the adjacent end closure disc 25 and the motor.

Advantage is taken of the hollow character of the tubular handle 14 and roller supporting parts to provide a passageway for an electric cord 35 connected at one end to the motor and extending outwardly from the handle at its other end for connection to a suitable electrical supply. If desired, the tubular handle also may be utilized as a passageway for the circulation of air in the transfer of heat away from the motor. Such circulation also may be provided by forming apertures 36 in the respective end closure discs.

It will be apparent that, when power is supplied to the motor 15, it will be transferred through the planetary gearing to the cylindrical roller support 24 and, through the frictional drive connection between the support and the roller 11, will rotate the roller. Depending on the type of surface 12 on the periphery of the roller and the material applied to the surface, its rotary motion may be used to buff, polish or apply a cleaning or polishing material to the surface to be treated. The roller may be removed easily by shifting it axially off over the roller support and may be replaced as easily with another roller having a different exterior surface. Being located within the roller support and the roller, the motor requires no extra space which would enlarge the total space occupied by the entire apparatus. For this reason, it is convenient to store and also may be maneuvered easily close to and beneath articles such as furniture on the surface being treated. The apparatus is made up of few parts which may be assembled together easily and therefore is of low cost. The maneuverability of the entire apparatus is facilitated by movement of the handle about the axis of rotation of the roller as indicated in FIG. 2 as permitted by the novel mounting of the roller directly on the handle.

In accordance with another aspect of the present invention, the location of the motor 15 within the roller 11 is utilized to facilitate the application of a thermoplastic surface treating material 37 to the surface 10 to be treated. For this purpose, a bar of the material, for example; wax which tends to soften when subjected to heat is mounted for movement into and out of engagement with the periphery 12 of the roller. The heat of the motor tends to raise the temperature of the roller periphery so that, when the wax bar engages the periphery, the engaging portion of the bar is softened by the heat and thereby is transferred easily to the roller for transfer to the treated surface.

The wax bar 37 in the present instance is of rectangular shape and is curved transversely to complement the shape of the roller 11. The bar is of the same length as the roller but extends circumferentially slightly less than a fourth of the distance around the roller. To simplify mounting and replacement of the bar, it is secured to the front curved face of a rectangular holder or backing member 38 formed of a suitable material such as plastic. Molded integral with the holder along one longitudinal edge and extending approximately half the length of the holder is a split sleeve 39 which telescopes closely over the first leg 18 of the U-shaped lower end portion of the handle as shown in FIGS. 3 and 8 and pivotally mounts the holder on the leg for swinging of the bar toward and away from the roller. The telescoping movement of the sleeve onto the leg is limited by abutment of the sleeve with the upright part of the handle 14, the ends of the roller and bar being alined with the sleeve in this position.

Normally, the wax bar 37 and its holder 38 are urged by a spring 40 into a retracted position spaced from the roller 11 as shown in FIG. 8. The spring is a tensile spring located within the upright portion of the handle and acting between the lower end of that portion and the inner end of a lever 41, the ends of the spring being hooked through apertures in the handle and the lever. The lever extends through a hole 42 in the upright handle portion and is fulcrumed intermediate its ends on a screw 43 threaded into a clip 44 which is secured by a screw to the outer side of the handle. At its outer end, the lever is pivotally connected by a screw and removable thumb-nut 45 to the upper end of a link 46 whose lower end is straddled by and pivotally connected to two ears 47 projecting rearwardly from the holder. To shift the bar toward the roller, the inner end portion of the lever is pivotally connected to the lower end of a rod 48 extending along the interior of the handle and having its upper end portion 49 bent laterally and extended through a hole 50 in the upper end portion of the upright handle to form a trigger. This trigger engages the lower edge of its hole to limit swinging of the wax bar away from the roller under the action of the spring, but is shiftable upwardly to move the bar inwardly against the roller. With the bar thus held in engagement with the roller and softened due to the heat of the roller from the motor within it, wax is transferred easily to the roller and from the roller to the surface to be treated.

It will be apparent that with the novel arrangement of the motor 15 within the roller 11, the latter is power driven and, yet, occupies no more space than a roller without a motor. The roller thus is easy to use even in cramped spaces and is easy to store when not in use. Also, it is light in weight and of simple and inexpensive manufacture due to the novel arrangement of gearing and the use of the roller and roller-supporting parts already available to house the gearing and mount the motor.

I claim:

1. A surface treating machine having, in combination, an elongated handle terminating in a U-shaped member having first and second laterally spaced legs connected by a cross member, said first leg projecting rigidly and laterally from one end of said handle and said second leg being spaced from and extending normal to the handle and having a tubular free end portion with a radially opening recess, a motor having a housing secured rigidly to and supported by said free end portion of said second leg, the shaft of said motor projecting from one side of said housing in alignment with said free end portion of said second leg, a sun gear carried by said shaft and rotating within said free end portion, a portion of said gear projecting through said radially opening recess of the second leg, a planetary gear mounted on said side of said motor housing to rotate about an axis parallel to the motor shaft and meshing with said projecting portion of said sun gear, a stub shaft projecting rigidly from the other side of said motor housing and aligned with said free end portion of said second leg, a hollow cylindrical supporting member enclosing said motor and coaxial with said motor shaft, two discs rigid with and closing the ends of said supporting member and journaled on said stub shaft and said free end portion of the second leg of the U between said cross member and said recess to support the member for rotation about the motor axis, a ring gear extending around the interior of and secured to said cylindrical member and meshing with said planetary gear, and a cylindrical roller telescoping over and rotatable with said supporting member and having a treating surface on its periphery.

2. A surface treating machine having, in combination, an elongated handle terminating in a leg extending transversely thereof and having a free end portion, a motor having a housing secured rigidly to and supported by said free end portion of the leg, said motor having a shaft projecting from one side of said housing in alignment with said free end portion of the leg and the free end portion having a recess opening radially of said shaft, a sun gear carried by said shaft and rotating within said free end portion, a portion of said gear projecting through said radially opening recess, a planetary gear mounted on said one side of said motor housing to rotate about an axis parallel to the motor shaft and meshing with said projecting portion of said sun gear, a stub shaft projecting rigidly from the opposite side of said motor housing in alignment with said free end portion of said leg, a hollow cylindrical supporting member enclosing said motor and coaxial with said motor shaft, two support elements rigid with end portions of said supporting member and journaled on said stub shaft and said free end portion of the leg to support the hollow cylindrical supporting member for rotation about the motor axis, a ring gear extending around the interior of and secured to said cylindrical member and meshing with said planetary gear, and a cylindrical roller telescoping over and rotatable with said supporting member and having a treating surface on its periphery.

3. A surface treating machine having, in combination, a motor enclosed in a housing and having a shaft extending from a first side of said housing, supports rigid with and projecting from the exterior of said first side of said housing and from the exterior of a second side of the housing opposite the first side, one of said supports having a recess opening radially of said shaft, a sun gear fastened on said shaft exteriorly of said housing and rotating within said one support, a portion of said gear projecting through said opening, a planetary gear mounted on the exterior of said first side of said motor housing to rotate about an axis parallel to the motor shaft and meshing with said projecting portion of said sun gear, a hollow cylindrical supporting member enclosing said motor in coaxial relation with said motor shaft, means journaled on said supports to support the hollow cylindrical supporting member for rotation about its axis, a ring gear extending around the interior of and secured to said cylindrical member and meshing with said planetary gear, a cylindrical roller telescoping over and rotatable with said hollow cylindrical member and having a treating surface on its periphery, and a handle attached to one of said supports and extending transversely thereof.

References Cited in the file of this patent

UNITED STATES PATENTS

| 1,973,915 | Stinsman | Sept. 18, 1934 |
| 2,568,699 | Anderson | Sept. 25, 1951 |

FOREIGN PATENTS

| 1,287 | Great Britain | of 1904 |
| 74,099 | Sweden | Apr. 19, 1932 |